T. Bailey.
Corn Harrow and Roller.

No. 106,765. Patented Aug. 30, 1870.

Witnesses,
William L. Moss Jr
John Brown

Inventor
Timothy Bailey.

United States Patent Office.

TIMOTHY BAILEY, OF WYOMING, ILLINOIS.

Letters Patent No. 106,765, dated August 30, 1870.

IMPROVEMENT IN COMBINED HARROW AND ROLLER.

The Schedule referred to in these Letters Patent and making part of the same.

*To all whom it may concern:*

Be it known that I, TIMOTHY BAILEY, of Wyoming, in the county of Stark and in the State of Illinois, have invented a Combined Corn-Harrow and Roller; and do hereby declare that the following is a full, clear, and exact description thereof, reference being had to the annexed drawing making a part of this specification, in which like letters of reference refer to like parts, and in which—

Figure 1:
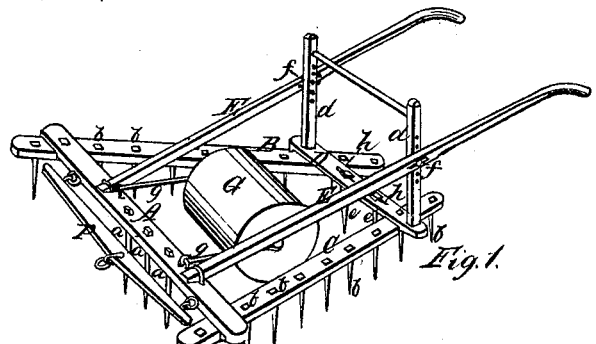
Figure 2:
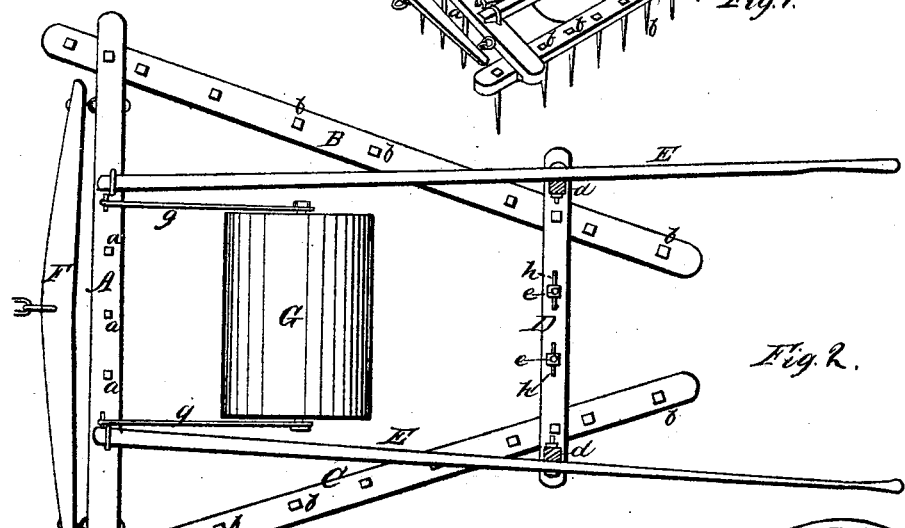
Figure 3:
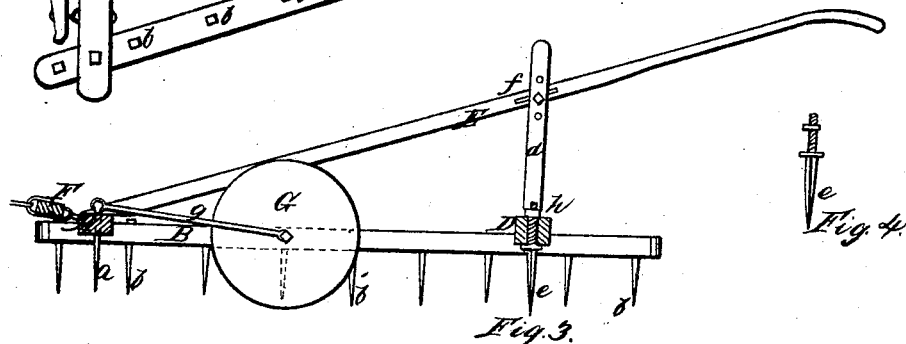

Figure 1 represents a perspective view;

Figure 2, a plan or superficial view;

Figure 3, a sectional elevation from front to rear; and

Figure 4:

Figure 4, one of the adjustable rear teeth.

This combined harrow and roller is designed, in the cultivation of corn, to do the work of harrowing and pulverizing the soil, at the same time that "following"-teeth throw the pulverized soil around the tender plant, the teeth in question being made adjustable for that purpose, and running on each side of the "corn-row."

In the drawing—

A B C D represent the frame of the harrow, the front bar A and the side bars B C being of nearly equal length, say from five to seven feet long, the shorter bar, D, being in the rear of the frame, but parallel with the front bar.

Each of the side bars carries the usual form of harrow-teeth, and converge to the rear bar.

The front bar, A, is armed with two, three, or more adjustable teeth, which run immediately in front of roller G.

D represents the rear bar of the frame, secured to the side bars, and carrying at either end a vertical standard, *d*, designed for the support and adjustment of the "handles" E E, and two or more teeth *e e*, the blades of which would exhibit a lozenge-shaped section, designed to move the soil to either side of their course, according to the inclination given to them by a common form of adjustment; as, for instance, a thread cut on their upper ends, which respectively are set in a vertical slot, *h*, cut in the bar, and secured on the surface of the latter by means of a nut, each tooth or blade having a proper shoulder beneath the bar to maintain their position and "set."

E E are the handles for managing the machine; they are pivoted or hinged by their lower or forward ends to the front bar A, and have each a slot, *f*, at the part near their respective standard, *d*, to which they are adjustable, at a convenient height, by means of bolts, nuts, and several holes, or some equivalent fastening, to the standard.

F is the double-tree, for the draft, hinged or attached, at either end, to the front bar A.

G is a "roller," not too heavy, about eighteen to twenty inches in diameter, and from eighteen to twenty-four inches in length, placed in the space in the middle of the frame, and hinged to the front bar of the same by a rod, *g*, on either end of its axle, the whole designed to allow the roller free latitude on uneven soil.

The operation of this combined harrow and roller is as follows:

When the corn is germinating, or is an inch or two above the soil, the harrow and roller are used together, and I will describe this operation first.

The harrow and roller are drawn over the corn-rows, the center of the harrow and roller coinciding with that of the row. The teeth *a a a*, in the front bar A break the crust, or clods, and root out weeds on either side of the plants. The roller following breaks the clods left by the teeth, and pulverizes the soil around the corn. The roller is followed up by the adjustable teeth *e e*, in the rear bar D, one of which passes on either side of the plant, and are set at such an angle by their nuts as will cause them to move the freshly pulverized soil toward the corn, in a greater or lesser degree, as may be desired.

When the plants are too high to allow of the passage over them of the harrow and roller combined, the roller is removed from the harrow as well as the front teeth of the latter, and cultivation is then done by means of the teeth in the side bars B C, and the adjustable teeth *e e*, in the rear bar of the harrow.

I claim as my invention—

The arrangement of roller G and harrow A B C D, the former moving within the latter, in combination with the breaking-teeth, *a a a*, of the harrow, and the distributing-teeth *e e* of the same, the standards *d d*, adjustable handles E E, and stationary double-tree F, all substantially as and for the purposes described.

In testimony that I claim the foregoing, I, TIMOTHY BAILEY, have hereunto set my hand this 18th day of April, 1870.

TIMOTHY BAILEY.

Witnesses:
WILLIAM L. MOSS, Jr..
JOHN BROWN.